Figure 1:
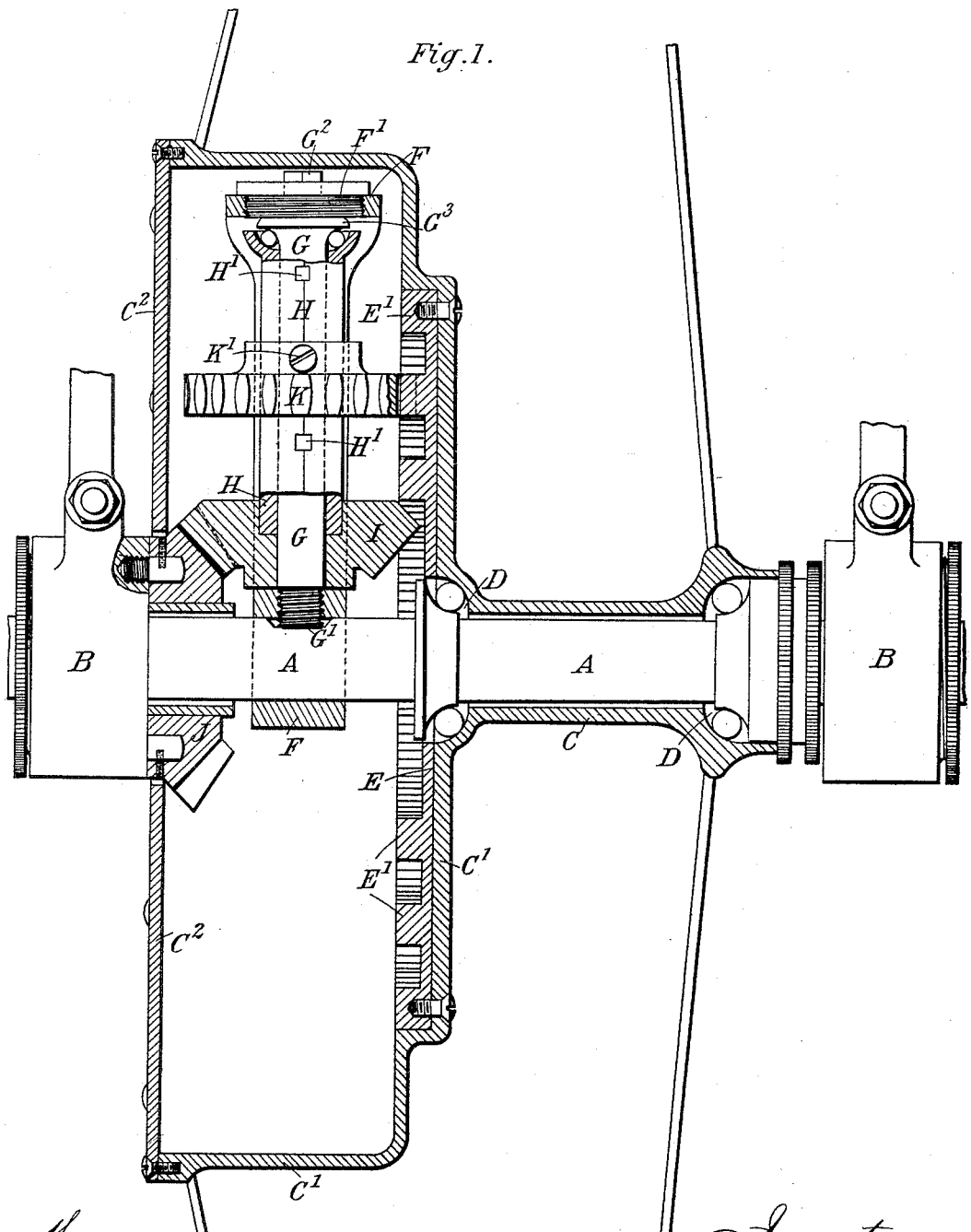

(No Model.) 2 Sheets—Sheet 1.

F. G. ADAMS & F. T. HENSHAW.
DRIVING MECHANISM FOR VELOCIPEDES.

No. 477,095. Patented June 14, 1892.

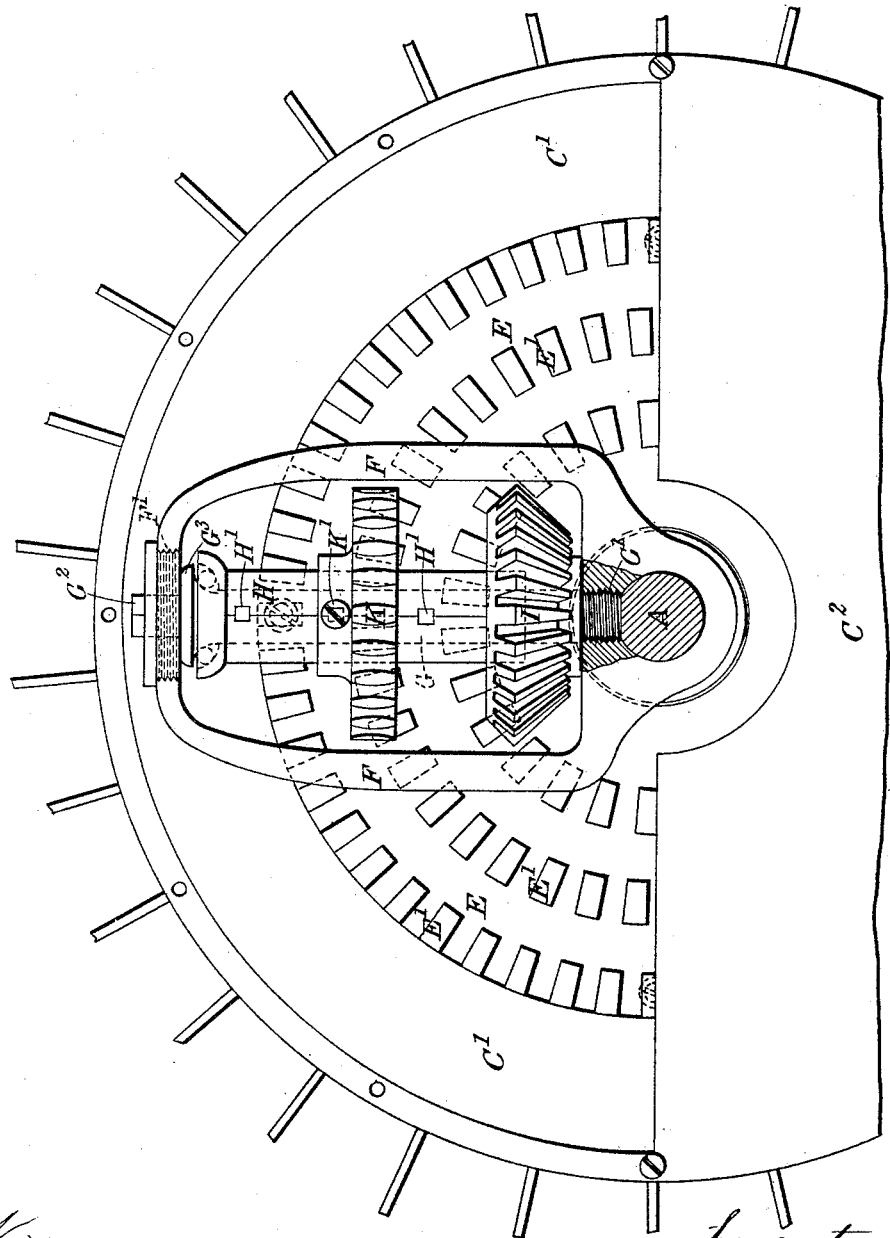

UNITED STATES PATENT OFFICE.

FREDERICK GEORGE ADAMS AND FRANCIS TOMLIN HENSHAW, OF LONDON, ENGLAND.

DRIVING MECHANISM FOR VELOCIPEDES.

SPECIFICATION forming part of Letters Patent No. 477,095, dated June 14, 1892.

Application filed February 18, 1892. Serial No. 421,992. (No model.)

*To all whom it may concern:*

Be it known that we, FREDERICK GEORGE ADAMS, engineer, and FRANCIS TOMLIN HENSHAW, professor of music, subjects of the Queen of Great Britain, and both residents of London, England, have invented a certain new and useful Improved Driving Mechanism for Velocipedes, of which the following is a specification, reference being had to the accompanying drawings.

The object of this invention is to provide simple mechanism whereby the rates of the angular velocity of the crank-shaft or driving-shaft to that of the driven wheel of the velocipede may be readily varied within suitable limits to suit the convenience of the rider. According to this invention we gear the crank-shaft or driving-shaft to the driven wheel of the velocipede by means of an arrangement of toothed gearing similar in the principle of its action to an epicyclic train, but differing from epicyclic trains as hitherto constructed in certain essential features, which are hereinafter clearly set forth.

In order that our invention may be clearly understood, we will now proceed to describe the same with reference to the accompanying drawings, in which—

Figure 1 is a section on the line of the axis of the central portion of a velocipede-wheel to which improved driving mechanism according to our invention is applied; and Fig. 2 is a side elevation of Fig. 1, certain parts of the mechanism being omitted for the sake of clearness.

A is the crank-shaft or driving-shaft of the velocipede. B B are the bearings in which the said shaft rotates.

C is the hub of the wheel, and C' is an extension thereof, which, with the cover-plates $C^2$, secured thereto, forms a casing for containing the gearing, hereinafter described, and for preventing the access of dirt and dust thereto. Ball-bearings are provided at D between the hub C and the crank-shaft A to permit of the free relative rotation of these parts.

E is a disk secured to the extension C' of the hub and provided with three concentric rings E' of teeth.

F is a frame firmly secured to the crank-shaft A and turning therewith.

G is an arm, the end G' of which is screwed into the frame F, as shown, and bears upon a flat formed upon the crank-shaft, so as to prevent the frame from moving relatively to the said crank-shaft. The opposite end of the arm G is provided with a squared portion $G^2$, to which a spanner or other tool is applied when the said arm is screwed into place.

F' is a boss, which is provided with a central orifice and is passed over the end of the arm G and screwed into the frame F, so as to bear upon a shoulder $G^3$ on the said arm G, and thus assist in retaining it in place.

H is a sleeve rotatable upon the arm G, and I is a bevel-wheel firmly secured to the sleeve H and gearing with a stationary bevel-wheel J, which in the present example is attached to one of the crank-shaft bearings B.

K is a toothed pinion adjustable endwise along the sleeve H, which in cross-section is rectangular, the boss of the pinion K having a central orifice of corresponding form, so that the pinion may rotate with but not relatively to the said spindle.

H' are notches upon the sleeve H, and K' is a screw provided in the boss of the pinion K for the purpose of engaging with the said notches, so that the said pinion, when suitably adjusted on the sleeve H, may be retained in proper position to engage with any one of the three rings E' of teeth. The teeth of the pinion K are curved on their working faces, as shown, in order that they may gear equally well with either of the said rings E'. If the crank-shaft A be rotated, the arm G will be carried round with it, and the sleeve H and pinion K will always receive a constant amount of rotation about the arm G during each revolution of the crank-shaft because of the rotation imparted to the bevel-wheel I as it is rolled by the arm G over the teeth of the stationary bevel-wheel J, the amount of the said rotation depending upon the proportions of the wheels I and J. The angular movement imparted to the hub C by the pinion K during one revolution of the crank-shaft A will be inversely proportioned to the diameter of the particular ring of teeth on the extension C' with which the said pinion may be engaged, and as the said pinion may readily be moved by hand along the sleeve H into gear with either of the three rings E' and retained in the position on the sleeve by causing the screw K' to engage with either one of the notches H' it will be seen that this gear affords a very simple and convenient means of varying the angular velocity of the driven wheel relatively to that of the crank-shaft or driving-shaft.

Without departing from this invention we may employ two or more arms G and wheels I and K, and the number and proportions of the rings of teeth upon the hub or upon an attachment thereto may be varied, as may be deemed desirable. Moreover, we do not limit ourselves to the use of a sleeve H of rectangular cross-section, it being essential only that such a sleeve should be employed as will permit of the pinion K being readily moved along it and firmly secured thereto.

For the wheel I and pinion J we may substitute a single wheel adjustable upon an arm secured to the crank-shaft, the teeth of the said wheel and of the aforesaid stationary wheel and the toothed ring being so arranged that by moving the said single wheel along the arm it may be brought into gear with any one of the said rings, while remaining always in gear with the stationary wheel.

Instead of fixing the wheel J permanently to the forks or crank-shaft bearings, it may be mounted so as to be rotatable upon a bearing, on which it is normally prevented from rotating by means of a friction-strap brake or equivalent device, and when desired the wheel J may be released from the influence of the said brake and the crank-shaft kept stationary by the feet of the rider while the machine is in motion running downhill, for instance.

What we claim is—

1. In driving mechanism for velocipedes, an epicyclic train consisting of a non-rotating gear-wheel secured to the frame or body of the machine, a series of concentric gear-wheels or rings of teeth secured to or forming part of the driven wheel, and an intermediate wheel carried upon an arm secured to the driving-shaft and adapted to gear with the said non-rotating wheel and with any one of the said concentric gear-wheels or rings of teeth, substantialy as set forth.

2. In driving mechanism for velocipedes, an epicyclic train consisting of a non-rotating gear-wheel secured to the frame or body of the machine, a series of concentric gear-wheels or rings of teeth secured to or forming part of the driven wheel, and an intermediate wheel carried upon an arm secured to the driving-shaft and adapted to gear with the said non-rotating gear-wheel, said intermediate wheel carrying a pinion which may be made to gear with any one of the said concentric gear-wheels or rings of teeth, substantially as set forth.

3. In driving mechanism for velocipedes, the combination of the non-rotating wheel J, secured to the frame of the machine, the series of concentric rings of teeth E', secured to the driven wheel, the arm G, secured to the driving-shaft A, the intermediate wheel I, mounted on the said arm, said wheel I having a sleeve H, which carries a pinion K, and means for securing the pinion K in various positions to cause it to gear with any one of the said concentric rings E', substantially as set forth, and for the purpose specified.

4. In an epicyclic driving mechanism for velocipedes, the combination, with the stationary wheel and driven wheel, of an intermediate compound wheel constructed in two parts, one part of which is adapted to slide axially on the other, said compound wheel being supported by a frame F, substantially as described.

In testimony whereof we have signed our names in the presence of two subscribing witnesses.

FREDERICK GEORGE ADAMS.
FRANCIS TOMLIN HENSHAW.

Witnesses:
WM. JNO. TENNANT,
F. W. LE TALL,
Both of 45 Southampton Buildings, London.